(12) United States Patent
Park

(10) Patent No.: US 11,558,666 B2
(45) Date of Patent: Jan. 17, 2023

(54) METHOD, APPARATUS, AND NON-TRANSITORY COMPUTER READABLE RECORD MEDIUM FOR PROVIDING CONTENT BASED ON USER REACTION RELATED TO VIDEO

(71) Applicant: LINE Plus Corporation, Seongnam-si (KR)

(72) Inventor: Eunae Park, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 17/173,657

(22) Filed: Feb. 11, 2021

(65) Prior Publication Data
US 2021/0258643 A1    Aug. 19, 2021

(30) Foreign Application Priority Data

Feb. 19, 2020    (KR) .................. 10-2020-0020178

(51) Int. Cl.
*H04N 21/475*    (2011.01)
*H04N 21/442*    (2011.01)
*H04N 21/4788*    (2011.01)

(52) U.S. Cl.
CPC ... *H04N 21/44222* (2013.01); *H04N 21/4756* (2013.01); *H04N 21/4788* (2013.01)

(58) Field of Classification Search
None
See application file for complete search history.

(56) References Cited

U.S. PATENT DOCUMENTS

| | | | |
|---|---|---|---|
| 2009/0317060 A1* | 12/2009 | Han | G11B 27/105 386/353 |
| 2016/0366203 A1 | 12/2016 | Blong et al. | |
| 2017/0177718 A1* | 6/2017 | Loganathan | H04L 67/22 |
| 2017/0300754 A1* | 10/2017 | Ohm | G06K 9/6227 |
| 2021/0349531 A1* | 11/2021 | Hajimirza | G06F 3/04842 |

FOREIGN PATENT DOCUMENTS

| | | |
|---|---|---|
| KR | 10-0827198 B1 | 5/2008 |
| KR | 10-2014-0104163 A | 8/2014 |
| KR | 10-2017-0072858 A | 6/2017 |

OTHER PUBLICATIONS

Communication dated Mar. 4, 2021 issued by the Korean Intellectual Property Office in Korean Application No. 10-2020-0020178.

* cited by examiner

*Primary Examiner* — Alazar Tilahun
*Assistant Examiner* — Charles N Hicks
(74) *Attorney, Agent, or Firm* — Sughrue Mion, PLLC

(57) ABSTRACT

A method, an apparatus, and a non-transitory computer-readable record medium for providing content based on a user reaction related to a video are provided. A content providing method includes: providing a user interface that comprises a plurality of interaction types to input one or more user reactions to a video during a playback of the video; storing a user reaction of a specific interaction type, which is input through the user interface among the plurality of interaction types, in association with a specific frame of the video based on a reaction input time at which the user reaction is input; and providing content related to the specific frame in response to a playback request associated with the user reaction.

20 Claims, 10 Drawing Sheets

FIG. 6

| Frame 610 | Interaction 620 |
|---|---|
| Frame_1 | Interaction_a |
| ... | ... |
| Frame_n | Interaction_b |
| ... | ... |

FIG. 8

| Frame 610 | Object 830 | Interaction 620 |
|---|---|---|
| Frame_1 | Object_i | Interaction_a |
|  | ... | ... |
| ... | ... | ... |
| Frame_n | Object_x | Interaction_b |
|  | ... | ... |
| ... | ... | ... |

METHOD, APPARATUS, AND NON-TRANSITORY COMPUTER READABLE RECORD MEDIUM FOR PROVIDING CONTENT BASED ON USER REACTION RELATED TO VIDEO

CROSS-REFERENCE TO RELATED APPLICATION

This application claims priority under 35 U.S.C. § 119 to Korean Patent Application No. 10-2020-0020178, filed Feb. 19, 2020 in the Korean Intellectual Property Office, the disclosure of which is incorporated by reference herein in its entirety.

BACKGROUND

1. Field

Apparatuses and methods consistent with example embodiments relate to collecting a user reaction to a video and using the same.

2. Description of Related Art

The rapid increase in users of high-speed communication networks enables the development of new services and diversification of service items through a communication network. The most general service among services using the communication network may be called a video providing service.

An Over The Top (OTT) service refers to a service that provides media content, such as a broadcasting program and movie through the open Internet. As a streaming service is enabled with the developments of broadband Internet and the developments of mobile communication, the OTT service is expanding to various electronic devices, such as a personal computer (PC) and a smartphone.

For example, technology for providing a video link service to a mobile communication terminal has been developed to allow a user of the mobile communication terminal to watch a linked video on the move via the Internet.

SUMMARY

Example embodiments may provide a user interface capable of inputting various interaction types of user reactions to a corresponding video with the video.

Example embodiments may associate a user reaction to a video with a specific frame based on a point in time at which the corresponding user reaction is input.

Example embodiments may provide content related to a frame in which a user reaction is present during a video playback process.

Example embodiments may provide content related to a frame in which a specific type of a user reaction is present in response to a request for content related to the specific type of the user reaction to a video.

According to an aspect of an example embodiment, there is provided a content providing method including: providing a user interface that comprises a plurality of interaction types to input one or more user reactions to a video during a playback of the video; storing a user reaction of a specific interaction type, which is input through the user interface among the plurality of interaction types, in association with a specific frame of the video based on a reaction input time at which the user reaction is input; and providing content related to the specific frame in response to a playback request associated with the user reaction.

The storing may include associating the user reaction with the specific frame that is displayed at the reaction input time.

The storing may include associating the user reaction with a number of previous frames of the specific frame that is displayed at the reaction input time.

The storing may include associating the user reaction with a specific object in the specific frame based on a location in the specific frame at which the user reaction is input.

The storing may include associating the specific frame with a reaction magnitude that is calculated based on a number of inputs per unit time of the user reaction.

The providing the user interface may include, while the video is displayed on a screen, displaying the user interface on the screen at a location at which a preset user input is recognized, and the storing may include associating the user reaction with a specific object in the specific frame based on the location at which the user input is recognized.

The providing the content related to the specific frame may include displaying an image that represents an interaction type of the user reaction associated with the specific frame, among the plurality of interaction types.

The storing may include associating the specific frame with a reaction magnitude that is calculated based on a number of inputs per unit time of the user reaction, and the displaying may include displaying the image by applying the reaction magnitude to a graphic element of the image.

The providing the content related to the specific frame may include providing the content that may include at least a portion of the specific frame associated with the user reaction of the specific interaction type in response to a request for the content related to the user reaction of the specific interaction type.

The providing the content related to the specific frame may include providing the content that is created based on the user reaction of the specific interaction type by a plurality of users viewing the video, in response to a request for the content related to the user reaction of the specific interaction type.

According to an aspect of another example embodiment, there is provided a non-transitory computer-readable record medium storing instructions that, when executed by at least one processor, cause the at least one processor to perform the content providing method.

According to an aspect of another example embodiment, there is provided a computer apparatus including: at least one memory configured to store computer-readable instructions; and at least one processor configured to execute the computer-readable instructions to: provide a user interface that comprises a plurality of interaction types to input one or more user reactions to a video during a playback of the video; control the at least one memory to store a user reaction of a specific interaction type, which is input through the user interface among the plurality of interaction types, in association with a specific frame of the video based on a reaction input time at which the user reaction is input; and provide content related to the specific frame in response to a playback request associated with the user reaction.

The at least one processor may be further configured to execute the computer-readable instructions to: associate the user reaction with the specific frame that is displayed at the reaction input time.

The at least one processor may be further configured to execute the computer-readable instructions to: associate the user reaction with a predetermine number of previous frames of the specific frame that is displayed at the reaction input time.

The at least one processor may be further configured to execute the computer-readable instructions to: associate the user reaction with a specific object in the specific frame based on a location in the specific frame at which the user reaction is input.

The at least one processor may be further configured to execute the computer-readable instructions to: associate the specific frame with a reaction magnitude that is calculated based on a number of inputs per unit time of the user reaction.

The at least one processor may be further configured to execute the computer-readable instructions to: generate a control signal to display an image that represents an interaction type of the user reaction associated with the specific frame with the specific frame, among the plurality of interaction types.

The at least one processor may be further configured to execute the computer-readable instructions to: associate the specific frame with a reaction magnitude that is calculated based on a number of inputs per unit time of the user reaction, and generate the control signal to display the image by applying the reaction magnitude to a graphic element of the image.

The at least one processor may be further configured to execute the computer-readable instructions to: provide the content that comprises at least a portion of the specific frame associated with the user reaction of the specific interaction type in response to a request for the content related to the user reaction of the specific interaction type.

The at least one processor may be further configured to execute the computer-readable instructions to: calculate statistics of the video based on the user reaction by a plurality of users viewing the video.

According to an aspect of another example embodiment, there is provided an electronic device comprising: a display; at least one memory configured to store computer-readable instructions; and at least one processor configured to execute the computer-readable instructions to: play a video on the display; while playing the video, provide a graphic user interface that comprises a plurality of interaction types to input a user reaction to the video; while playing the video, detect a user input that selects one of the plurality of interaction types; associate the user reaction corresponding to the selected interaction type, with a specific frame of the video, based on a time at which the user input is input to the video, and in response to a request for a content corresponding to the selected interaction type, provide the content that is generated based on the specific frame.

The at least one processor may be further configured to execute the computer-readable instructions to: when the user input occurs a plurality of times, associate the user reaction corresponding to the selected interaction type, with a plurality of specific frames of the video, based on the plurality of times at which the user input is input to the video, and wherein the content corresponding to the selected interaction type comprises a list of a plurality of video clips corresponding to the plurality of specific frames, respectively.

BRIEF DESCRIPTION OF THE DRAWINGS

The above and/or other aspects will be more apparent by describing certain example embodiments, with reference to the accompanying drawings, in which:

FIGS. 5 to 8 illustrate examples of a user interface screen for describing a process of providing an interface for collecting a user reaction according to at least one example embodiment.

DETAILED DESCRIPTION

Figure 1:
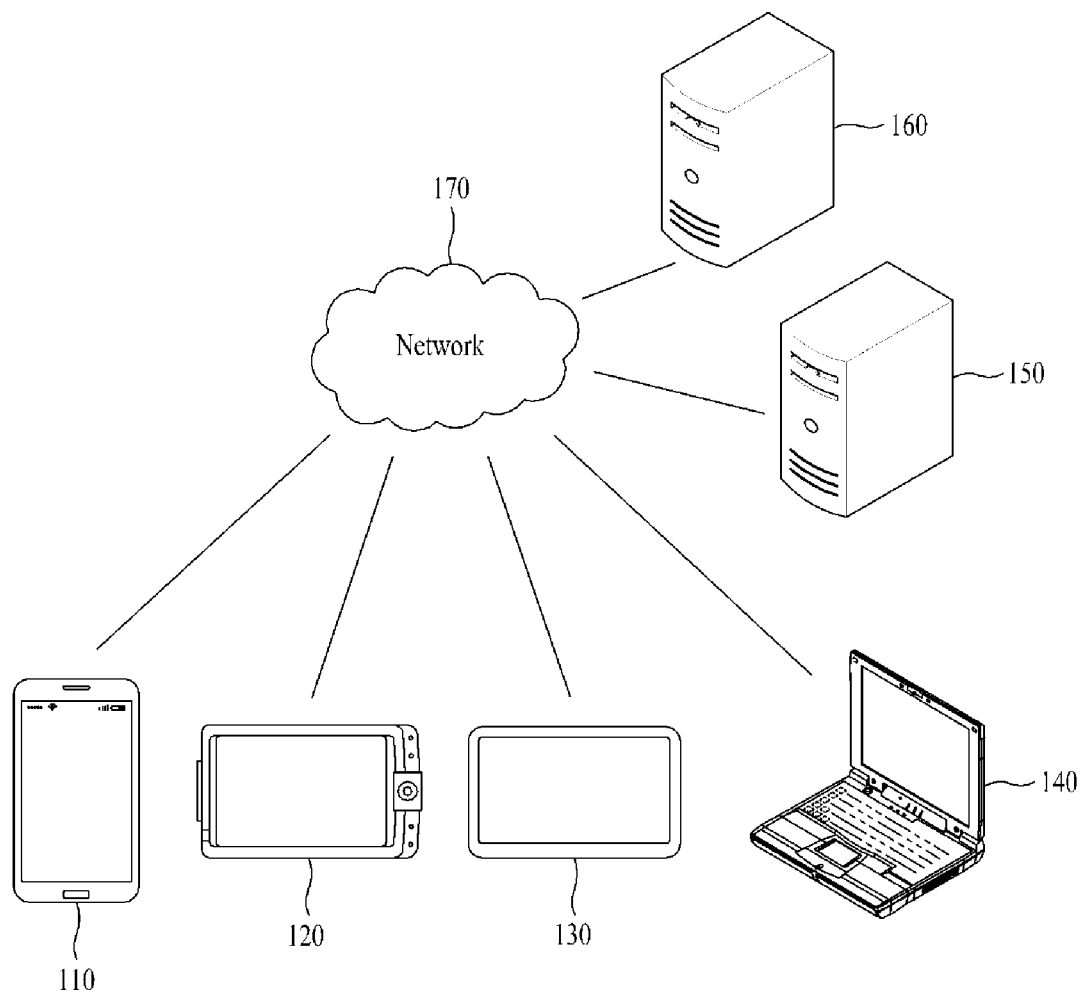
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to forward and/or distribute the computer programs, program code, instructions, or some combination thereof, over a network. The remote computing system may forward and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for collecting a user reaction to a video and using the same.

The example embodiments including the disclosures described herein may associate a user reaction to a video with a specific frame based on a point in time at which the corresponding user reaction is input and may provide content related to a frame in which the user reaction is present during a video playback process.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. Each of the electronic devices 110, 120, 130, and 140 may be configured as a computer apparatus or a plurality of computer apparatuses that provide instruction, a code, a file, content, a service, and the like, through communication with the server 150 or 160 over the network 170. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, and the like, through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, for example, the server 150 may provide, as the first service, a service (e.g., a video service) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
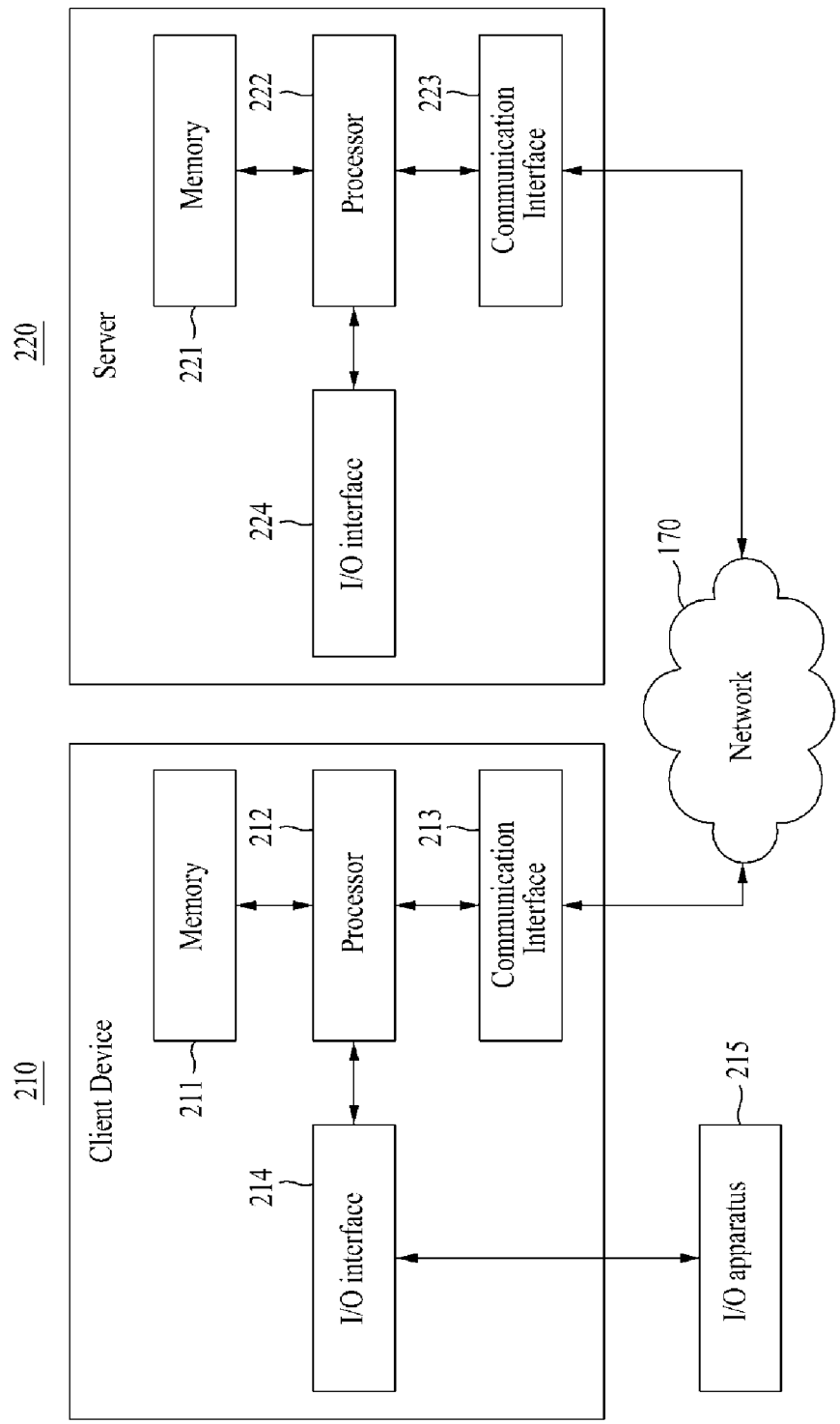
FIG. 2 is a diagram illustrating an example of an electronic device and a server according to at least one example embodiment.

FIG. 2 is a block diagram illustrating an example of a client device 210 and a server 220 according to at least one example embodiment. The client device 210 may correspond to any of the electronic devices 110, 120, 130, and 140 shown in FIG. 1, and the server 220 may correspond to any of the servers 150 and 160 shown in FIG. 1.

Referring to FIG. 2, the client device 210 may include a memory 211, a processor 212, a communication interface 213, and a input/output (I/O) interface 214, and the server 220 may include a memory 221, a processor 222, a communication interface 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the client device 210 or the server 220 as a permanent storage device separate from the memory 211, 221. Also, an OS and at least one program code, for example, a code for a browser installed and executed on the client device 210 or an application installed and executed on the client device 210 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication interface 213, 223, instead of the non-transitory computer-readable record medium. For example, at least one program may be loaded to the memory 211, 221 based on a computer program, for example, the application, installed by files provided over the network 170 from developers or a file distribution system, for example, the server 220, providing an installation file of the application.

The processor 212, 222 may be configured to process instructions of a computer program by performing basic arithmetic operations, logic operations, and I/O operations. The computer-readable instructions may be provided from the memory 211, 221 or the communication interface 213, 223 to the processor 212, 222. For example, the processor 212, 222 may be configured to execute received instructions in response to the program code stored in the storage device, such as the memory 211, 221.

The communication interface 213, 223 may provide a function for communication between the client device 210 and the server 220 over the network 170 and may provide a function for communication between the client device 210 and another client device or another server, and between the server 220 and another client device or server. For example, the processor 212 of the client device 210 may forward a request created based on a program code stored in the storage device such as the memory 211, to the server 220 over the network 170 under control of the communication interface 213. The client device 210 may receive a control signal, an instruction, content, a file, etc., provided under control of the processor 222 of the server 220, through the communication interface 213 of the client device 210. For example, a control signal, an instruction, content, a file, etc., of the server 220 received through the communication interface 213 may be forwarded to the processor 212 or the memory 211, and content, a file, etc., may be stored in a storage medium, for example, the permanent storage device, further includable in the client device 210.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the client device 210. Also, the I/O interface 224 of the server 220 may be a device for interface with an apparatus for input or output that may be connected to the server 220 or included in the server 220. In detail, when the processor 212 of the client device 210 processes an instruction of a computer program loaded to the memory 211, content or a service screen configured based on data provided from the server 220.

According to other example embodiments, the client device 210 and the server 220 may include a number of components greater than or less than a number of components shown in FIG. 2. For example, the client device 210 may include at least a portion of the I/O apparatus 215, or may further include other components, for example, a transceiver, a global positioning system (GPS) module, a camera, a variety of sensors, a database (DB), and the like. In detail, if the client device 210 is a smartphone, the client device 210 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, example embodiments of a method and system for providing content based on a user reaction related to a video are described.

Figure 3:
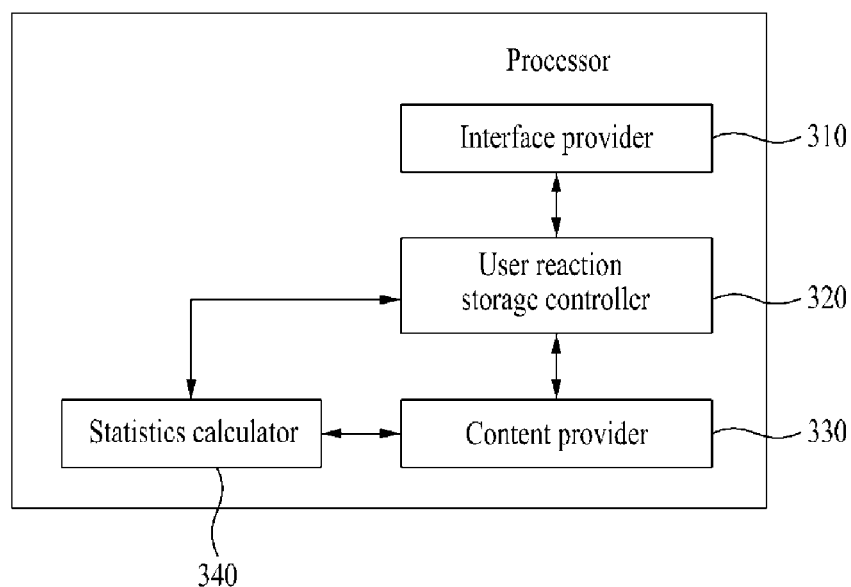
FIG. 3 is a diagram illustrating an example of components includable in a processor of an electronic device according to at least one example embodiment.
Figure 4:
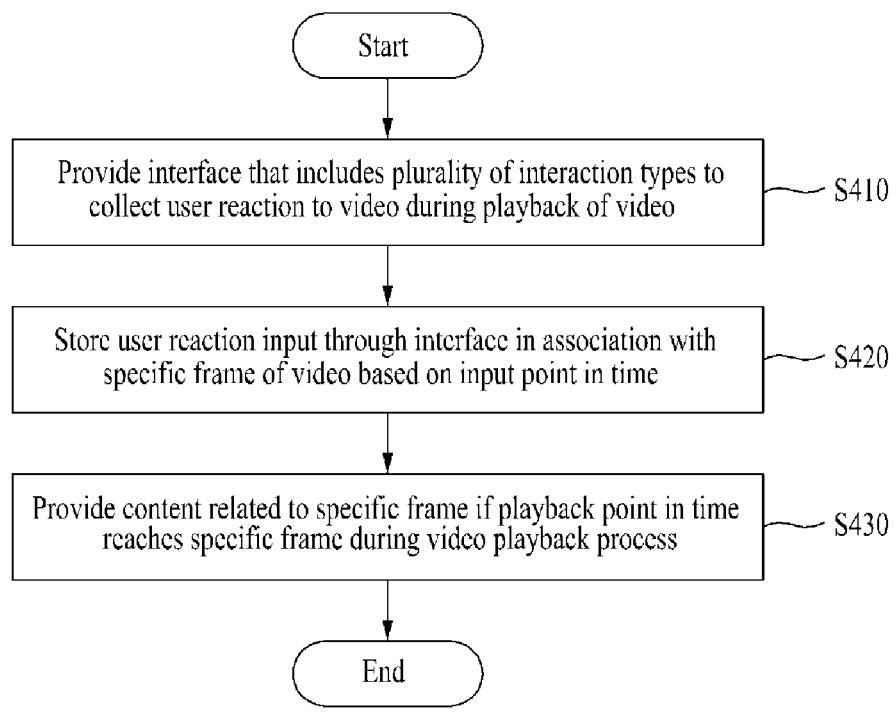
FIG. 4 is a flowchart illustrating an example of a content providing method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

A computer-implemented content providing system may be configured on the client device 210 according to the example embodiment. For example, the content providing system may be configured in a form of a program that independently operates or in an in-app form of a specific application, for example, a messenger, to be operable on the specific application. Depending on cases, the content providing system may provide content related to a video in a video service environment through interaction with the server 220. The content providing system may be configured in an in-app form of a video player installed on the client device 210 and may collect a user reaction to a video being played back on the video player and may provide content related to the video based on the user reaction.

The content providing system configured on the client device 210 may perform the content providing method of FIG. 4 in response to an instruction provided from the application installed on the client device 210. Referring to FIG. 3, to perform the content providing method, the processor 212 of the client device 210 may include an interface provider 310, a user reaction storage controller 320, and a content provider 330. Depending on example embodiments, the components of the processor 212 may be selectively included in or excluded from the processor 212. Also, depending on example embodiments, the components of the processor 212 may be separated or merged for representations of functions of the processor 212.

The processor 212 may read instructions from the memory 211 to control the client device 210, and particularly, to control the processor 212 to perform the content providing method of FIG. 4.

The processor 212 and the components of the processor 212 may perform operations S410 to S430 of the content providing method. For example, the processor 212 and the components of the processor 212 may be configured to execute instructions according to a code of at least one program and a code of an OS included in the memory 211. Here, the components of the processor 212 may be representations of different functions of the processor 212 performed by the processor 212 in response to an instruction provided from a program code stored in the client device 210, for example, an instruction provided from an application executed on the client device 210. For example, the interface provider 310 may be used as a functional representation of the processor 212 that controls the client device 210 to provide a user interface (UI) for collecting a user reaction to a video in response to the instruction.

Referring to FIG. 4, in operation S410, the interface provider 310 may provide an interface (hereinafter, a reaction collection interface) that includes a plurality of interaction types as a user interface for collecting a user reaction to a video during a playback of the video. The video may include a live streamlining video, and the client device 210 may execute a media player application that is installed on the client device 210 to display the video on a display screen. The user reaction may include any types of user actions that a user may provide as a feedback to the video while viewing the video. For example, the reaction collection interface may include an emotion stamp capable of expressing a variety of emotions (like, warm, sad, angry, happy, scared, surprised, confused, etc.) and a comment input interface capable of inputting an opinion in a comment form. The reaction collection interface may include various types of interfaces capable of inputting a user reaction through various types of interactions, such as share, vote, sympathize, and subscribe, in addition to the emotion stamp or the comment input. For example, the interface provider 310 may display the reaction collection interface in a continuous active status while the video is being played back. Here, the reaction collection interface may be displayed at a fixed location on a video player screen. As another example, when a preset type of a user input, for example, a double tap or a long tap, is recognized on a screen on which the video is displayed during a video playback, the interface provider 310 may display the reaction collection interface at a location at which the user input is recognized. That is, in response to a separate user input on a video playback screen, the interface provider 310 may display the reaction collection interface and, here, may display the reaction collection interface at a location at which the user input is recognized or at a location adjacent thereto.

In operation S420, the user reaction storage controller 320 may control the memory 211 or communicate with the server 220 to store, in the memory 211 or 211 (or another external memory), a user reaction input through the reaction collection interface in association with a specific frame of the video based on a point in time at which the corresponding user reaction is input. The user reaction storage controller 320 may perform a control operation to store a user reaction of an interaction input through the reaction collection interface as an action that is caused by the user viewing the video. In particular, the user reaction storage controller 320 may associate the user reaction in association with a portion of the frame of the video based on the point in time at which the user reaction is input. For example, if the user inputs "like" stamp (e.g., a thumbs up emoji that shows a human hand with the thumb extended and facing upward) in the middle of viewing the video, the user reaction storage controller 320 may perform a control operation to store a corresponding interaction in association with a frame of a point in time at which the stamp is input. The user reaction storage controller 320 may associate the interaction with the frame or a link (e.g., a Uniform Resource Locator (URL)) to a location where the frame is stored, based on a reaction input time at which the reaction is input while the video is being played. The reaction input time may refer to an elapsed time shown on a track bar of a media player at the time when the reaction is input to the media player, and the user reaction storage controller 320 may associate the frame (e.g., $1500^{th}$ frame) that is displayed on the media player at the elapsed time (e.g., 16 minute 12 second of a total 50 minute video), with the reaction input time (e.g., 16 minute 12 second). Here, the user reaction storage controller 320 may associate the corresponding user reaction with a certain number of previous frames (e.g., 100 frames) of a frame (e.g., $1500^{th}$ frame) that is displayed at a point in time at which the user reaction is input. The number of the previous frames may be determined based on an amount of time used for the user to recognize the video and input a reaction.

In addition to storing a user reaction in association with a video frame, the user reaction may also be stored in association with an object (a person or a thing in the frame) displayed on the corresponding video frame. The user reaction storage controller 320 may associate a corresponding user reaction with a specific object of a frame displayed at a point in time at which the user reaction is input (or a predetermined number of previous frames of the frame displayed at the point in time at which the user reaction is input) based on a location at which the user reaction is input. Here, the location at which the user reaction is input may correspond to a location at which a user input for displaying the reaction collection interface is recognized. For example, if the user inputs "like" stamp at a location at which person 1 is displayed in a video frame in which persons 1, 2, and 3 appear while viewing the video, the user reaction storage controller 320 may generating a control signal to store the corresponding interaction in association with person 1. Here, the user reaction storage controller 320 may recognize an object at a location at which the user reaction is input in the video frame based on object recognition technology and may associate the recognized object with the corresponding user reaction. Alternatively, the user reaction storage controller 320 may specify an object at a location at which the user reaction is input based on metadata that includes object information of the video frame and may associate the recognized object with the corresponding user reaction.

In storing the user reaction in association with the video frame, the user reaction storage controller 320 may perform a control operation to store the user reaction further in association with a reaction magnitude that represents an input magnitude of the corresponding user reaction. The user reaction storage controller 320 may determine the reaction magnitude based on a number of times the user reaction is input per time unit and may associate the reaction magnitude of the user reaction with the corresponding user reaction. For example, if the user continuously inputs "like" stamp several times at a specific scene in the middle of viewing the video, the user reaction storage controller 320 may store the corresponding interaction and a reaction magnitude corresponding to a number of times the corresponding interaction is input in association with a frame at which the corresponding interaction is input.

The user reaction storage controller 320 may transmit a user reaction to each frame of the video to the server 220, and the user reaction may be used in various manners for a service providable from the server 220.

In operation S430, the content provider 330 may display an image representing the user reaction stored in the specific frame, as an example of content related to the specific frame, if a playback point in time reaches the specific frame in which the user reaction is stored during a video playback process in response to a replay request from the user. The content provider 330 may display a user reaction in a frame corresponding thereto by displaying a video frame and a user reaction stored in the corresponding frame in an image form at a corresponding timing of a video playback.

As another example, in response to a request for content related to a specific interaction type of a user reaction from the user, the content provider 330 may provide content that includes at least a portion of a frame in which the corresponding type of the user reaction is stored. Here, the content may be created on a local or created by the server 220 based on the specific interaction type of the user reaction by the user of the client device 210. For example, in response to a content request from the user, the content provider 330 may provide results in which frames that include the specific interaction type of the user reaction are sorted in order of a reaction magnitude or may provide a frame corresponding to a largest reaction magnitude among the frames that include the specific interaction type of the user reaction.

Also, the content may be created by the server 220 based on the specific interaction type of the user reaction by another user viewing the corresponding video as well as the user of the client device 210. The server 220 may collect a user reaction to each frame of the video from a plurality of electronic devices 110, 120, 130, and 140 that are clients. In response to a request for content related to the specific interaction type of the user reaction from the client device 210, the server 220 may select a frame in which the corresponding user interaction is stored by at least a desired number of users and may provide content that includes the corresponding frame to the client device 210. For example, the server 220 may create a video of a desired section based on the frame in which the specific interaction is stored by the at least a desired number of users as a highlight video and may provide the created video.

As another example, in response to a request for content related to a specific interaction type of a user reaction from the user, the content provider 330 may provide content related to an object in which the corresponding specific interaction type of the user reaction is stored. Here, the content may be created by the server 220. For example, in response to a request for content related to the specific interaction type of the user reaction from the client device 210, the server 220 may provide location information (e.g., an URL) related to the object in which the corresponding specific interaction type of the user reaction is stored. When the object in which the specific interaction type of the user reaction is stored is a specific person, the server 220 may provide profile information of the specific person and other videos in which the specific person appears. When the object is a specific thing, the server 220 may provide image search results and shopping information of the specific thing.

Depending on example embodiments, the processor 212 may further include a statistics calculator 340 configured to calculate statistics of the video based on a user reaction associated with each frame with respect to a plurality of frames included in the video. The processor 212 may provide the server 220 with a variety of statistical information calculated through the statistics calculator 340.

The server 220 may collect a user reaction to each frame of the video from the plurality of electronic devices 110, 120, 130, and 140 and may provide various indices or statistical information based on the collected user reaction. That is, the server 220 may calculate an index for each frame based on a user reaction and a reaction magnitude for each frame and may create statistical data based on the index for each frame.

The server 220 may provide a video ranking and a frame ranking in the video based on statistics collected from the electronic devices 110, 120, 130, and 140.

In detail, when user 1 expresses "sad" in a fifth frame and "like" in a fifteenth frame of the corresponding video and another user, for example, user 2 expresses "sad" in the fifth frame, "like" in the fifteenth frame, and "like" in a $100^{th}$ frame of the corresponding video, the server 220 may display the $100^{th}$ frame in which a reaction "like" of the user 2 is present as a thumbnail for the user 1 having not viewed the $100^{th}$ frame to induce the user 1 to continuously consume the corresponding video or may recommend the user 1 with another video not consumed by the user 1 among videos to which reactions of the user 2 were good.

The server 220 may recommend another video preferred by users based on statistics collected from the electronic devices 110, 120, 130, and 140.

In terms of a video recommendation, the server 220 may recommend a video based on statistics according to a user reaction rather than a simple number of views or a number of playbacks associated with the video. For example, when a number of views for video 1, video 2, and video 3 is 1000, 1500, and 2000, respectively, and a number of reactions input from users to video 1, video 2, and video 3 is 10000, 30000, and 12000, respectively, video 2 has a higher reaction rate than that of video 3. Therefore, the server 220 may recommend videos in order of video 2, video 3, and video 1.

The processor 212 may store a user reaction (e.g., a point in time at which a user inputs a comment and a point in time at which the user inputs "like" stamp) to a video the user is currently viewing, and may display the previously stored user reaction when playing back the video, such as replay, using such record. In this manner, the server 220 may provide user experience of a feeling of viewing with the video and may also provide visualized statistical information such as rating information. Also, in the case of storing comment information that is one of user reactions in association with a timestamp included in the video, the processor 212 may provide a service such that the video starts to play back from a point in time at which comment information is input in response to the user accessing the video through the comment.

FIGS. 5 to 8 illustrate examples of a user interface screen for describing a process of providing a reaction collection interface according to an example embodiment.

Figure 5:
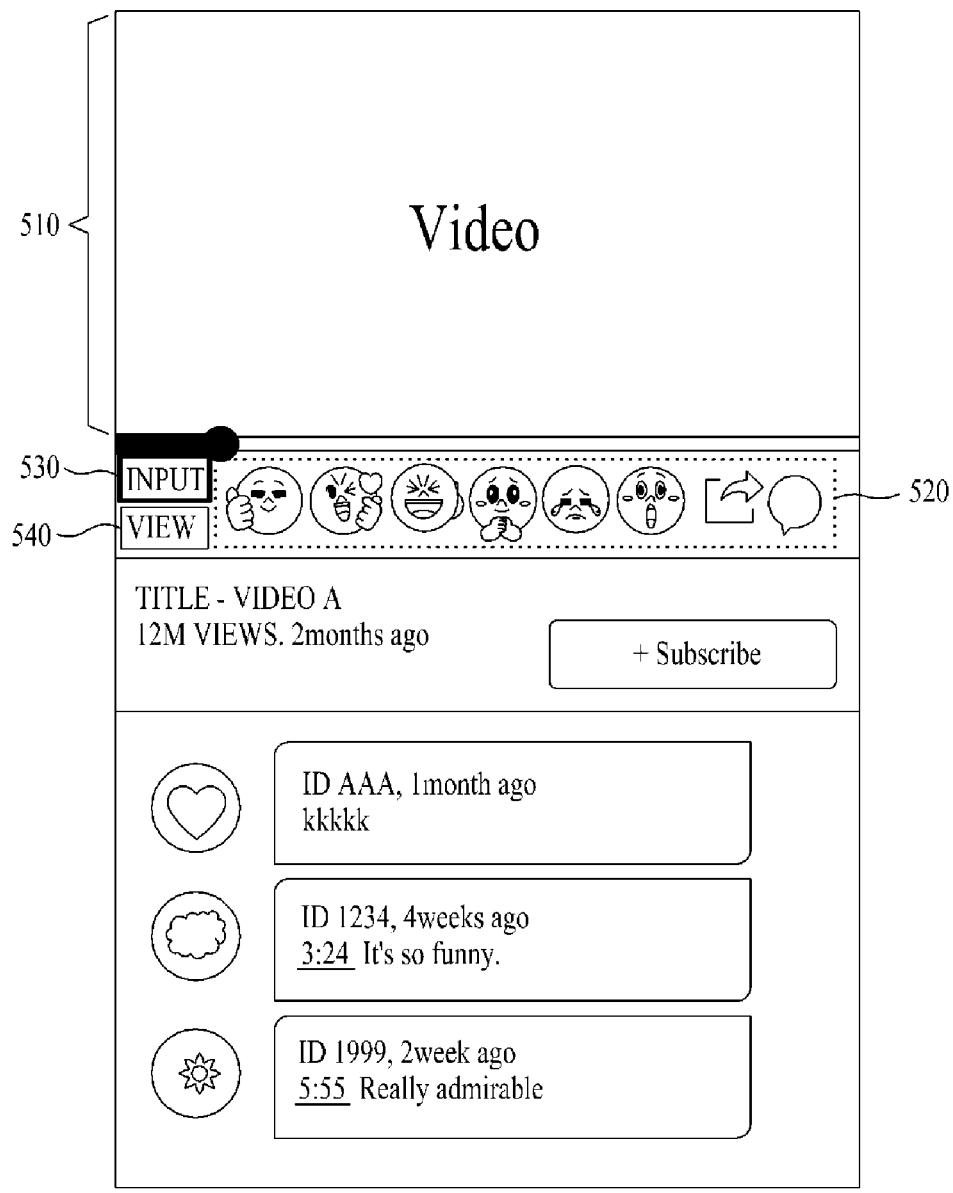
Figure 7:
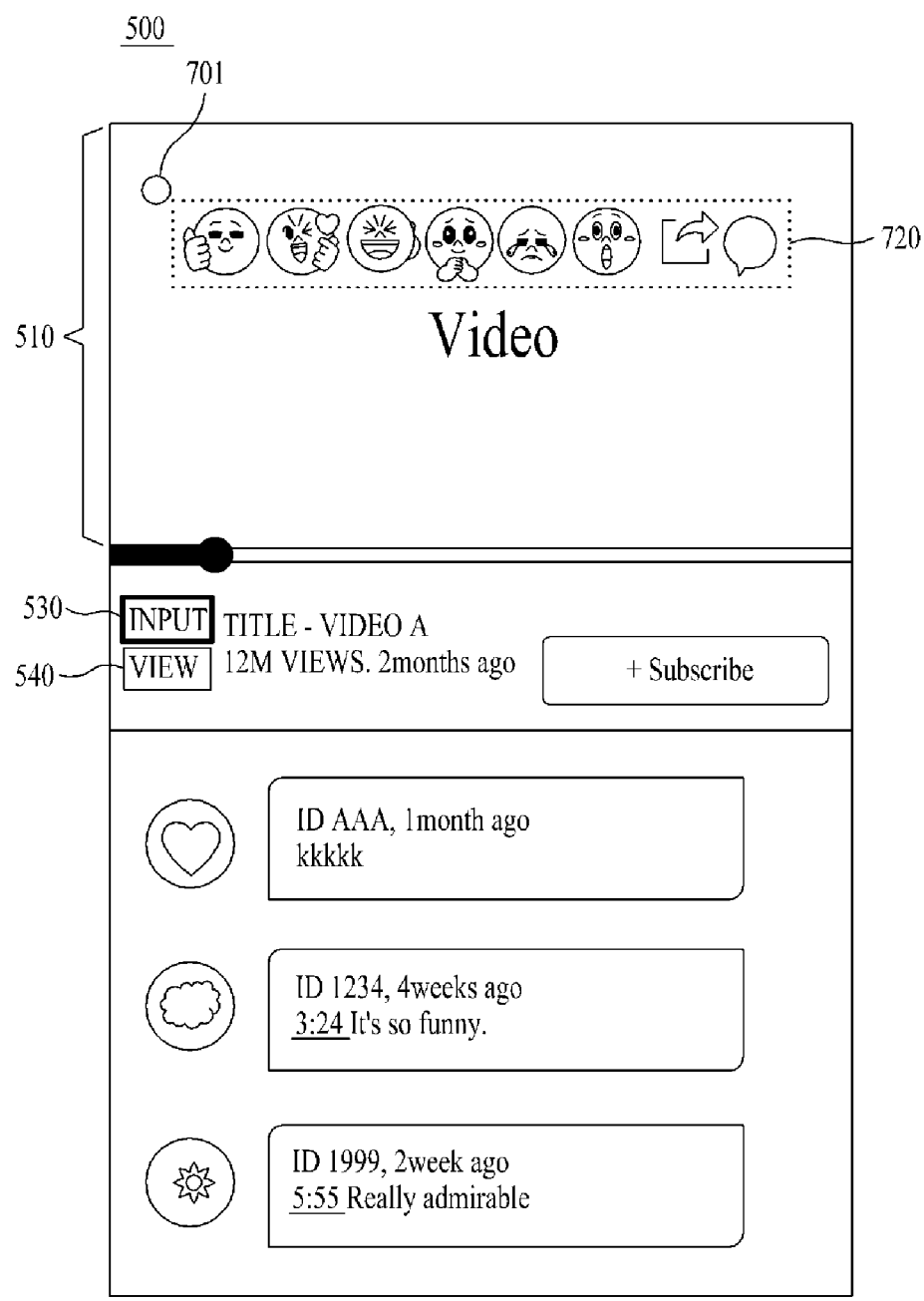

FIGS. 5 and 7 illustrate a video service page 500 and may be examples of a screen displayed on a display of the client device 210.

Referring to FIG. 5, the client device 210 may execute a media player configured to display the video service page 500. The video service page 500 may include a video playback area 510 for displaying a video selected by the user of the client device 210 and a reaction collection interface 520 that includes a plurality of interaction types at a predetermined (or, alternatively, desired) location of the video service page 500. The media player may provide an input button 530 to enter into a reaction input mode, and a view button 540 to enter into a content view mode. When the media player is in the reaction input mode, a user is allowed to select one of the interaction types from the reaction collection interface 520, to store a video frame that is displayed at the time of inputting the interaction type, in association with the selected interaction type. The operation of the media player in the content view mode will be described with reference to FIG. 10.

The reaction collection interface 520 may include an emotion stamp capable of expressing a user reaction as a variety of emotions, such as, for example, like, warm, sad, angry, etc., a comment input interface capable of inputting an opinion in a comment form, and an interface for interaction, such as share, vote, sympathize, and subscribe.

The reaction collection interface 520 may be displayed maintaining an active status at a fixed location with the video playback area 510 on the video service page 500.

If the user inputs a specific interaction type of a user reaction through the reaction collection interface 520 while viewing the video being played back on the video playback area 510, the user reaction storage controller 320 may generate a control signal to store the corresponding user reaction in association with a frame displayed at a reaction input time at which the user reaction is input.

Referring to FIG. 6, the user reaction storage controller 320 may store a user reaction 620 input through the reaction collection interface 520 for one or more frames 610 of a video. That is, in response to an input of a specific interaction of the user reaction 620 through the reaction collection interface 520 during a video playback, the user reaction storage 320 may associate the input user reaction 620 with the specific frame 610 at the reaction input time. The user reaction storage controller 320 may collect and store the user reaction 620 frame-by-frame.

As another example, referring to FIG. 7, in response to a preset type of a user input (e.g., a double tap and a long tap) 701 being recognized on the video playback area 510, the interface provider 310 may display a reaction collection interface 720 that includes a plurality of interaction types at a location at which the user input 701 is recognized.

In response to a separate user input on the video playback area 510, the interface provider 310 may display the reaction collection interface 720 and, here, may display the reaction collection interface 720 at the location at which the user input 701 is recognized or a location adjacent thereto. It is to specify a frame of the video and to specify an object in the frame. Here, the object may include a person, a thing, a place, and the like, distinguished from other portions and recognizable in the frame.

For example, if the user double taps a specific location on the video playback area 510 while viewing the video being played back on the video playback area 510, the interface provider 310 may display the reaction collection interface 720 at the specific location. In response to an input of a specific interaction type of a user reaction through the reaction collection interface 720, the user reaction storage controller 320 may store the corresponding user interaction in association with a frame at a point in time at which the reaction collection interface 720 is displayed and an object corresponding to a location at which the reaction collection interface 720 is displayed.

Referring to FIG. 8, the user reaction storage controller 320 may store the user reaction 620 input through the reaction collection interface 720 in association with each object 830 in the frame 610 of the video. That is, in response to an input of the specific interaction of the user reaction 620 at a specific location of the video playback area 510 through the reaction collection interface 720, the user reaction storage controller 320 may associate the input user reaction 620 with the specific frame 610 at a point in time at which the user reaction 620 is input and the object 830 at a location at which the user reaction 620 is input. The user reaction storage controller 320 may collect and store the user reaction 620 based on the object 830 displayed on the frame 610 of the video.

Figure 9:
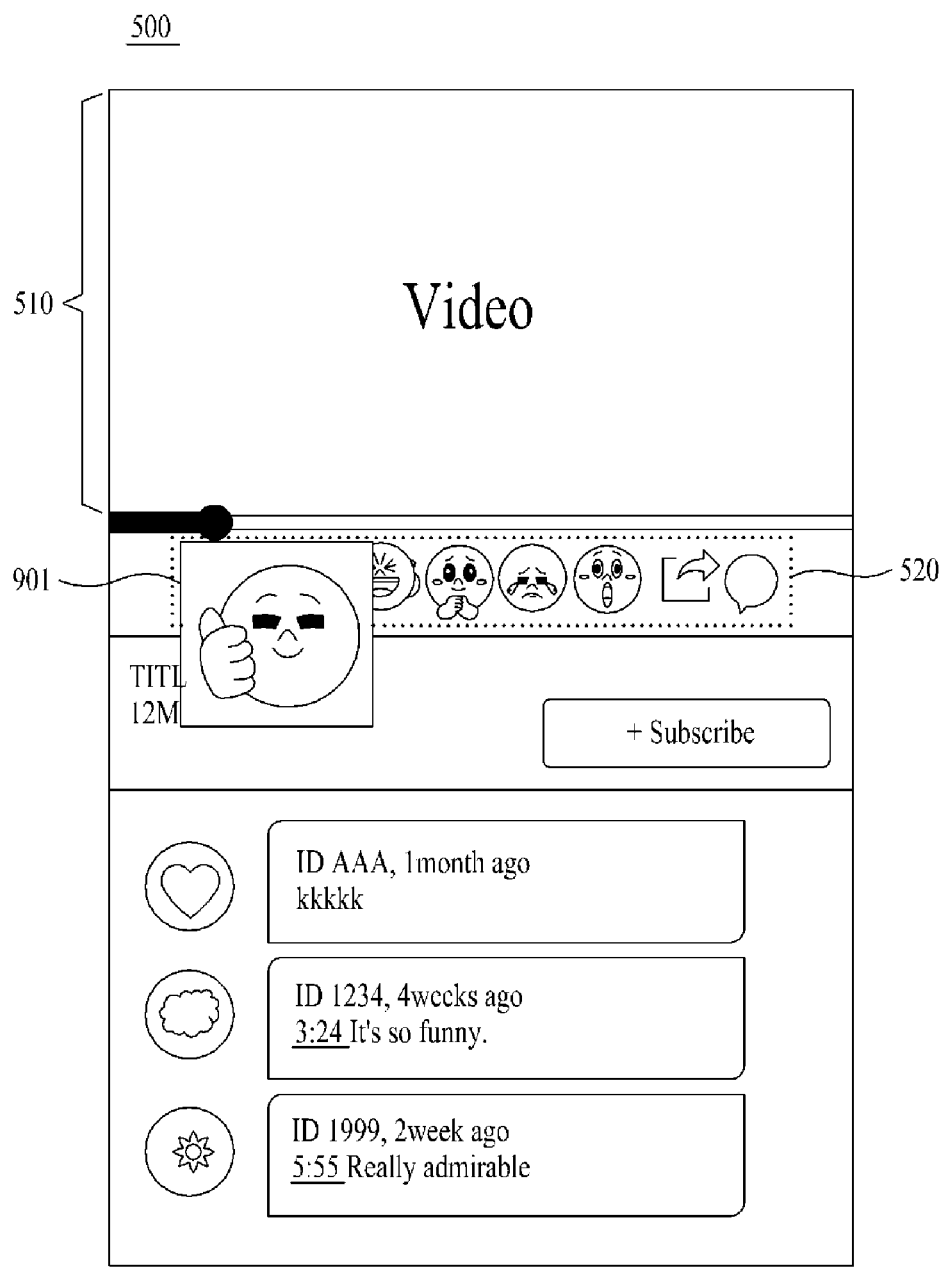
FIGS. 9 and 10 illustrate examples of a user interface screen for describing a process of providing content based on a user reaction according to at least one example embodiment.
Figure 10:
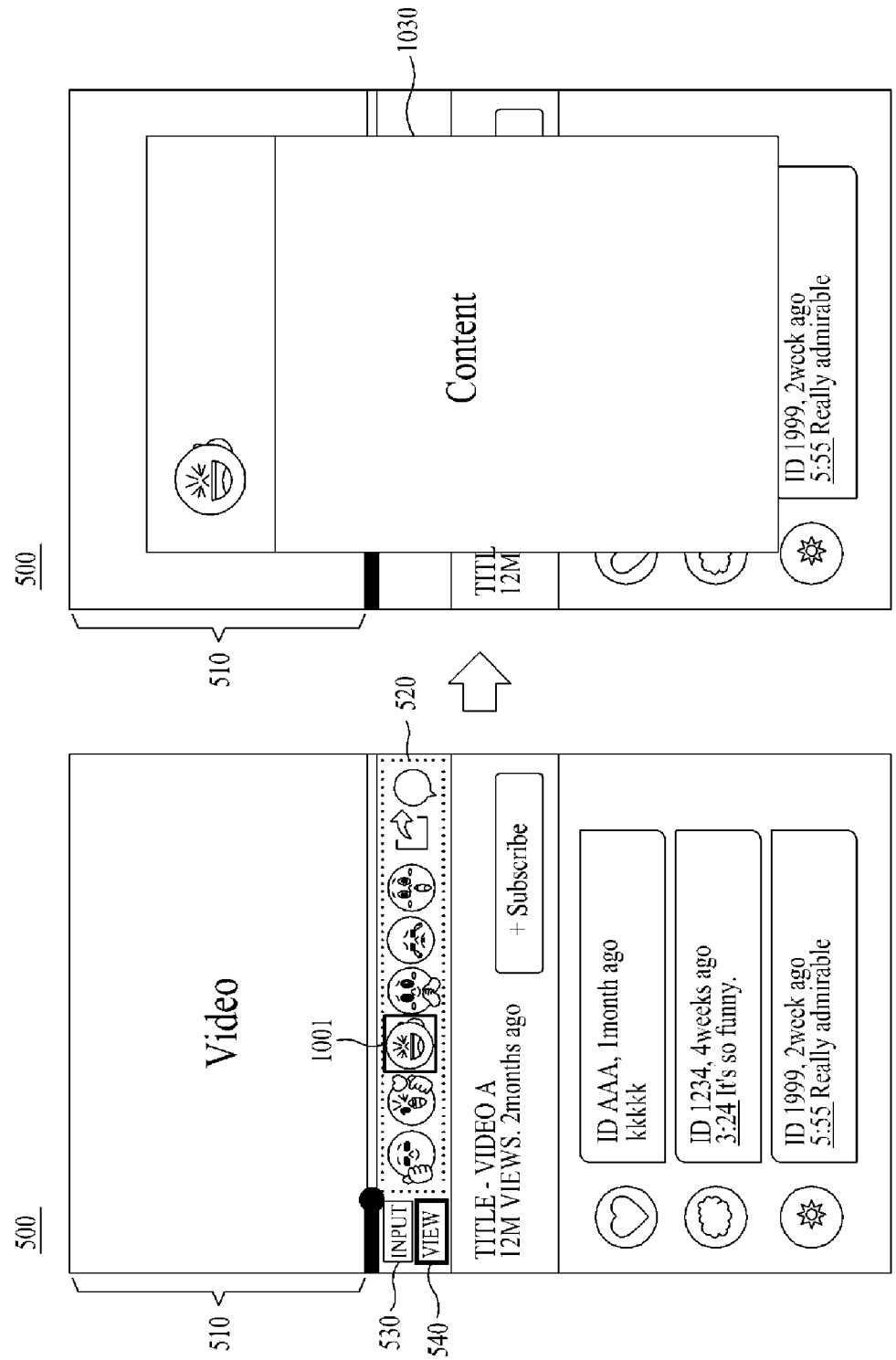

FIGS. 9 and 10 illustrate examples of a user interface screen for describing a process of providing content based on a user reaction according to an example embodiment.

FIGS. 9 and 10 illustrate the video service page 500 and may be examples of a screen displayed on a display of the client device 210.

If a playback point in time reaches a specific frame in which a user reaction is stored while a video is being played back on the video playback area 510 in response to a replay request from the user, the content provider 330 may display an image representing the user reaction stored in the specific frame.

For example, referring to FIG. 9, when a user reaction is stored in a frame displayed on the video playback area 510, the content provider 330 may highlight and display a UI image 901 representing an interaction type of the user reaction stored in the corresponding frame among interaction types included in the reaction collection interface 520 to be distinguished from other interaction types. Here, the content provider 330 may apply and display a reaction magnitude of the user reaction to the UI image 901 of the interaction type corresponding to the user reaction. For example, the greater the reaction magnitude of the user reaction, the content provider 330 may increase and thereby display a size of the UI image 901 or may differently display a display element, such as a color or a brightness of the UI image 901. As another example, in response to an additional selection on the UI image 901 displayed to be distinguished from other interaction types or an input UI for a user reaction corresponding to the UI image 901, the UI image 901 may be displayed by applying the additional input. For example, in response to an additional selection in a state in which the UI image 901 is highlighted and displayed, the content provider 330 may accumulate and apply a real-time reaction, such as the UI image 901 becoming larger or darker.

The content provider 330 may display a user reaction in a frame corresponding thereto by displaying a video frame and a user reaction stored in the corresponding frame in an image form at a corresponding timing of a video playback.

The content provider 330 may display an image representing a user reaction stored in a specific frame at a predetermined (or, alternatively, desired) location of the video service page 500 or on the video playback area 510 using various animation effects, such as, for example, flash.

In response to a request for content related to a specific interaction type of a user reaction from the user, the content provider 330 may provide content related to a frame in which the corresponding specific interaction type of the user reaction is stored.

For example, referring to FIG. 10, in response to a user specifying a single interaction type 1001 through the reaction collection interface 520 and requesting related content with respect to a video being played back on the video playback area 510 by selecting the view button 540, the content provider 330 may provide content 1030 related to a frame in which the specific interaction type 1001 of a user reaction is stored on the video being played back.

The content provider 330 may provide the content 1030 that includes a partial or entire portion of one or more frames that include the specific interaction type 1001 of the user reaction. For example, when the specific interaction type 1001 is selected from the reaction collection interface 520 at the time when $1000^{th}$ frame, $5000^{th}$ frame, and 15000th frame are displayed on the screen in the reaction input mode, and then the view button 540 is selected, the content provider 330 may provide, as the content 1030, results in which the 1000th frame, $5000^{th}$ frame, and $15000^{th}$ frame are sorted based on a predetermined criterion, for example, in the order of a reaction magnitude or in the order of the play time of the 1000th frame, $5000^{th}$ frame, and $15000^{th}$ frame. In another example, the content provider 330 may provide, as the contents 1030, a first video clip including a plurality of first consecutive frames (e.g., lth frame to $1000^{th}$ frame) including the $1000^{th}$ frame, a second video clip including a plurality of second consecutive frames (e.g., $4001^{st}$ frame to $5000^{th}$ frame) including the $5000^{th}$ frame, and a third video clip including a plurality of third consecutive frames (e.g., $14001^{st}$ frame to $15000^{th}$ frame) including the $15000^{th}$ frame.

The content provider 330 may also provide the content 1030 created by the server 220 in association with the frame that includes the specific interaction type 1001 of the user reaction. For example, the server 220 may collect all of user reactions to a video being played back on the video playback area 510 and may provide, as a highlight video, a desired section of a video based on a frame in which the specific interaction type 1001 of the user reaction is stored most.

According to some example embodiments, it is possible to store a user reaction to a video in association with a specific frame based on a point in time at which the corresponding user reaction is input and to provide content related to the frame in which the user reaction is stored during a video playback process.

The systems or the apparatuses described herein may be implemented using hardware components, software components, and/or a combination thereof. For example, a processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A content providing method, comprising:
providing a graphical user interface that comprises a plurality of interaction types to input a user reaction to a video during a playback of the video, each interaction type of the plurality of interaction types corresponding to a distinct user reaction indicating an emotion experienced by a user during the playback of the video;
receiving, from the user during the playback of the video, a user input, via the graphical user interface, indicating a selected interaction type from the plurality of interaction types;
associating the user reaction corresponding to the selected interaction type with a specific frame of the video, based on a reaction input time at which the user reaction is input to the video; and
in response to a playback request for a particular user reaction, providing content that has been associated to the particular user reaction by a quantity of users that exceeds a predetermined threshold.

2. The content providing method of claim 1, wherein the associating comprises associating the user reaction with the specific frame that is displayed at the reaction input time.

3. The content providing method of claim 1, wherein the associating comprises associating the user reaction with a number of previous frames of the specific frame that is displayed at the reaction input time.

4. The content providing method of claim 1, wherein the associating comprises associating the user reaction with a specific object in the specific frame based on a location in the specific frame at which the user reaction is input.

5. The content providing method of claim 1, wherein the associating comprises associating the specific frame with a reaction magnitude that is determined based on a number of inputs per unit time of the user reaction.

6. The content providing method of claim 1, wherein the providing of the graphical user interface comprises, while the video is displayed on a screen, displaying the graphical user interface on the screen at a location at which another user input is recognized, and
the associating comprises associating the user reaction with a specific object in the specific frame based on the location at which the user input is recognized.

7. The content providing method of claim 1, wherein the providing of the content comprises displaying an image that represents the particular user reaction.

8. The content providing method of claim 7, wherein the associating comprises associating the specific frame with a reaction magnitude that is determined based on a number of inputs per unit time of the user reaction, and
the displaying comprises displaying the image by applying the reaction magnitude to a graphic element of the image.

9. The content providing method of claim 1, wherein the providing of the content comprises providing the content that comprises at least a portion of the specific frame associated with the user reaction of the selected interaction type in response to a request for the content related to the user reaction of the selected interaction type.

10. The content providing method of claim 1, wherein the providing of the content comprises providing the content that is created based on the user reaction of the selected interaction type by a plurality of users viewing the video, in response to a request for the content related to the user reaction of the selected interaction type.

11. A non-transitory computer-readable record medium storing instructions that, when executed by at least one processor, cause the at least one processor to perform the content providing method of claim 1.

12. A computer apparatus comprising:
at least one memory configured to store computer-readable instructions; and
at least one processor configured to execute the computer-readable instructions to:
provide a graphical user interface that comprises a plurality of interaction types to input one or more user reactions to a video during a playback of the video, each interaction type of the plurality of interaction types corresponding to a distinct user reaction indicating an emotion experienced by a user during the playback of the video;
receive, from the user during the playback of the video, a user input, via the graphical user interface, indicating a selected interaction type from the plurality of interaction types;
associate a user reaction corresponding to the selected interaction type among the one or more user reactions, with a specific frame of the video based on a reaction input time at which the user input is input to the video; and
in response to a playback request for a particular user reaction, provide content that has been associated to the particular user reaction by a quantity of users that exceeds a predetermined threshold.

13. The computer apparatus of claim 12, wherein the at least one processor is further configured to execute the computer-readable instructions to:
associate the user reaction with the specific frame that is displayed at the reaction input time.

14. The computer apparatus of claim 12, wherein the at least one processor is further configured to execute the computer-readable instructions to:
associate the user reaction with a number of previous frames of the specific frame that is displayed at the reaction input time.

15. The computer apparatus of claim 12, wherein the at least one processor is further configured to execute the computer-readable instructions to:
associate the user reaction with a specific object in the specific frame based on a location in the specific frame at which the user reaction is input.

16. The computer apparatus of claim 12, wherein the at least one processor is further configured to execute the computer-readable instructions to:
associate the specific frame with a reaction magnitude that is determined based on a number of inputs per unit time of the user reaction.

17. The computer apparatus of claim 12, wherein the at least one processor is further configured to execute the computer-readable instructions to:
generate a control signal to display an image that represents the selected interaction type.

18. The computer apparatus of claim 17, wherein the at least one processor is further configured to execute the computer-readable instructions to:
associate the specific frame with a reaction magnitude that is determined based on a number of inputs per unit time of the user reaction, and
generate the control signal to display the image by applying the reaction magnitude to a graphic element of the image.

19. The computer apparatus of claim 12, wherein the at least one processor is further configured to execute the computer-readable instructions to:
provide content that comprises at least a portion of the specific frame associated with the user reaction of the selected interaction type in response to a request for the content related to the user reaction of the selected interaction type.

20. The computer apparatus of claim 12, wherein the at least one processor is further configured to execute the computer-readable instructions to:
calculate statistics of the video based on the user reaction by a plurality of users viewing the video.

* * * * *